United States Patent
Webster et al.

(10) Patent No.: US 8,087,346 B2
(45) Date of Patent: Jan. 3, 2012

(54) MULTIPLE BEVERAGE BREWER

(75) Inventors: Joseph P. Webster, St. Charles, MO (US); Jody G. Jacobsen, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 1187 days.

(21) Appl. No.: 11/825,999

(22) Filed: Jul. 10, 2007

(65) Prior Publication Data

US 2008/0028944 A1    Feb. 7, 2008

Related U.S. Application Data

(60) Provisional application No. 60/833,168, filed on Jul. 25, 2006.

(51) Int. Cl.
*A47J 31/40* (2006.01)

(52) U.S. Cl. .......... 99/283; 99/275; 99/279; 99/288; 99/452; 99/284; 99/291; 99/304; 99/307; 99/321; 99/286; 99/289 R; 137/625.42; D7/309

(58) Field of Classification Search ............ 99/275, 99/279, 283, 288, 452, 284, 291, 304, 307, 99/231, 289 R, 286; 137/170–170.6, 378.1, 137/625.42; D7/309; 426/29
See application file for complete search history.

(56) References Cited

U.S. PATENT DOCUMENTS

| | | | | |
|---|---|---|---|---|
| 236,792 A * | 1/1881 | Etzensberger | ........ | 99/288 |
| 514,988 A * | 2/1894 | Childs | ........ | 99/291 |
| 1,546,733 A * | 7/1925 | Humphrey | ........ | 137/170.2 |
| 1,967,553 A * | 7/1934 | Dietzel et al. | ........ | 62/166 |
| 2,414,669 A * | 1/1947 | Reich | ........ | 426/29 |
| 2,545,614 A * | 3/1951 | Goldberg | ........ | 141/105 |
| 2,644,478 A * | 7/1953 | Calabrese | ........ | 137/263 |
| 2,666,379 A * | 1/1954 | Kaminky | ........ | 99/282 |
| 2,667,114 A * | 1/1954 | Burgess, Jr. | ........ | 99/287 |
| 2,676,585 A * | 4/1954 | Pappas | ........ | 126/378.1 |
| 2,706,444 A * | 4/1955 | Chaplik | ........ | 99/282 |
| 2,761,200 A * | 9/1956 | Arnett | ........ | 99/283 |
| 2,830,528 A * | 4/1958 | Arnett | ........ | 99/283 |
| 2,935,010 A * | 5/1960 | Arnett et al. | ........ | 99/283 |
| 2,955,527 A * | 10/1960 | Collins et al. | ........ | 99/283 |
| 3,011,426 A * | 12/1961 | Mueller | ........ | 99/283 |
| 3,087,415 A * | 4/1963 | Murray et al. | ........ | 99/281 |
| 3,218,955 A | 11/1965 | Lorang | | |
| 3,319,561 A | 5/1967 | Bloomfield et al. | | |
| 3,517,603 A * | 6/1970 | Heifetz et al. | ........ | 99/283 |
| 3,520,247 A * | 7/1970 | Hester | ........ | 99/283 |
| 3,608,471 A * | 9/1971 | Martin | ........ | 99/283 |
| 3,671,273 A * | 6/1972 | Gunter | ........ | 99/275 |
| 3,771,432 A | 11/1973 | Karlen | | |

(Continued)

*Primary Examiner* — Tu B Hoang
*Assistant Examiner* — Brett Spurlock
(74) *Attorney, Agent, or Firm* — Paul M. Denk

(57) ABSTRACT

The multiple beverage brewer utilizes the vacant vertical spaces in an establishment, opens counterspace, and allows placement of different products, such as coffee varieties and flavors, for simultaneous brewing. The vertical multiple coffee brewer begins with a base, a housing upon the base extending upright while leaving room for at least one warmer on the base, a deck extending from the housing above the base with a brew basket and a coffee pot, at least one warmer on the deck, a second deck extending from the housing, and a top. The housing contains one tank for heating of water supplied to all of the brew baskets through piping and dump valves. Alternatively, the housing has two vertically stacked tanks supplied with fresh water but heating the water separately for delivery to each deck.

8 Claims, 4 Drawing Sheets

U.S. PATENT DOCUMENTS

| | | | |
|---|---|---|---|
| 3,958,502 A | 5/1976 | Vitous | |
| 4,054,085 A | 10/1977 | Tarr | |
| 4,069,750 A * | 1/1978 | Kemp | 99/280 |
| D254,892 S * | 5/1980 | Smit | D7/309 |
| D254,893 S * | 5/1980 | Smit | D7/309 |
| 4,464,981 A | 8/1984 | Stover | |
| 4,470,999 A * | 9/1984 | Carpiac | 426/506 |
| 4,478,139 A | 10/1984 | Zimmerman | |
| 4,603,620 A * | 8/1986 | Daugherty | 99/300 |
| 4,715,269 A * | 12/1987 | Stoner | 99/279 |
| D295,486 S * | 5/1988 | Eugster et al. | D7/309 |
| 4,757,754 A * | 7/1988 | Welker | 99/307 |
| D298,722 S * | 11/1988 | Nomura | D7/305 |
| 4,825,758 A * | 5/1989 | Snowball et al. | 99/282 |
| 4,829,888 A | 5/1989 | Webster et al. | |
| 4,867,048 A * | 9/1989 | Brewer | 99/283 |
| 4,892,031 A | 1/1990 | Webster et al. | |
| 5,063,836 A | 11/1991 | Patel | |
| D322,535 S * | 12/1991 | Van Camp | D7/308 |
| 5,094,153 A * | 3/1992 | Helbling | 99/280 |
| 5,158,793 A * | 10/1992 | Helbling | 426/231 |
| 5,161,455 A * | 11/1992 | Anson et al. | 99/280 |
| D335,607 S * | 5/1993 | Newman | D7/305 |
| 5,285,718 A * | 2/1994 | Webster et al. | 99/290 |
| D348,373 S | 7/1994 | Webster | |
| D350,868 S * | 9/1994 | Newman | D7/305 |
| D350,869 S * | 9/1994 | Newman | D7/305 |
| D358,290 S * | 5/1995 | Schroeder | D7/311 |
| D365,961 S * | 1/1996 | Cortese | D7/309 |
| 5,724,883 A * | 3/1998 | Usherovich | 99/290 |
| 5,740,719 A * | 4/1998 | Triola et al. | 99/302 R |
| 5,862,738 A * | 1/1999 | Warne | 99/281 |
| D409,432 S * | 5/1999 | O'Keefe | D7/309 |
| 5,901,634 A * | 5/1999 | Vancamp et al. | 99/281 |
| 6,095,031 A * | 8/2000 | Warne | 99/282 |
| 6,135,009 A * | 10/2000 | Lassota | 99/290 |
| 6,155,158 A * | 12/2000 | Anson | 99/280 |
| D440,109 S * | 4/2001 | Anton et al. | D7/307 |
| D446,999 S * | 8/2001 | Lord et al. | D7/397 |
| 6,612,224 B2 * | 9/2003 | Mercier et al. | 99/282 |
| 6,637,478 B2 * | 10/2003 | Jungmann et al. | 141/378 |
| 6,729,226 B2 * | 5/2004 | Mangiapane | 99/291 |
| D557,971 S * | 12/2007 | Webster et al. | D7/309 |
| D585,230 S * | 1/2009 | Webster et al. | D7/309 |
| 7,770,510 B2 * | 8/2010 | Hart et al. | 99/291 |
| 2004/0103791 A1 * | 6/2004 | Hart et al. | 99/279 |

* cited by examiner

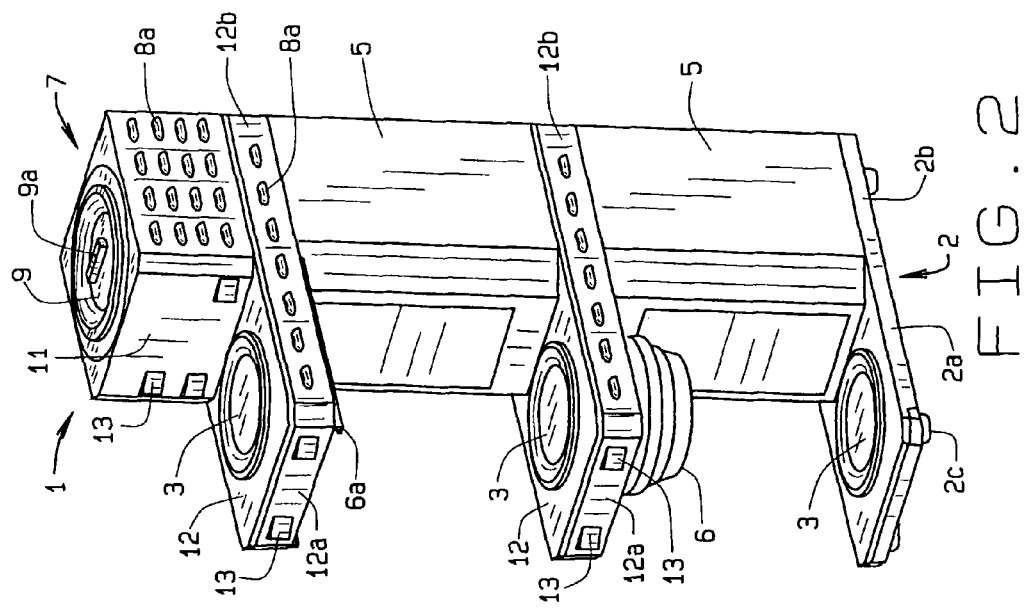
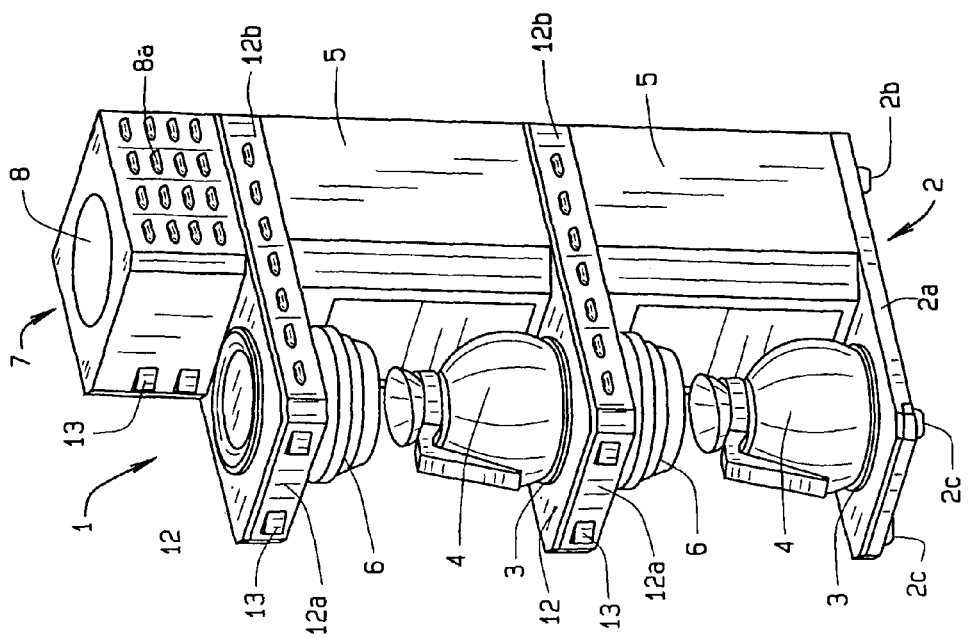

MULTIPLE BEVERAGE BREWER

CROSS REFERENCE TO RELATED APPLICATION

This non-provisional application claims priority to provisional application Ser. No. 60/833,168 filed on Jul. 25, 2006, which claims priority to the design patent application having Ser. No. 29/232,989, which was filed on Jun. 24, 2005, and has the same inventors.

BACKGROUND OF THE INVENTION

This invention relates generally to beverage brewers and particularly to a stacked brewer. The brewers typically make coffee upon a countertop at a restaurant or other establishment. Multiple brewers, on a countertop, increases the beverage brewed while occupying more counter space in competition with other products. The present invention increases beverage brewed per square foot by stacking at least two brewers vertically to reduce the countertop space required.

Various types of brewers have long been available in the prior art. All of these are for use for holding beverages generally one brewer in height. In addition, some of these vessels or brewers are of a fairly large size, and include their own spigot, at the bottom, that allows for the dispensing of any beverage maintained therein, during usage. Some of these brewers, even though they may be of substantial size, perhaps in the two to four gallon capacity, may yet be used in conjunction with the beverage brewing apparatus, whether it be for the preparation of hot tea or coffee, or other beverages, directly under a brew basket or other brewing apparatus, the beverage as brewed being deposited directly into the brewer, of substantial volume, for eventual dispensing and consumption. Having a variety of these types of brewers, provided around a counter or shelf, as in a commercial establishment or restaurant, or even in an office, occupies a fair amount of counter space. Hence, the present invention provides for vertical stacking of brewers, one upon the other, as a needed enhancement and a desirable contribution to the field of beverage brewing and serving, for various types of facilities.

Beverage brewers occupy counterspace in a footprint. The footprint is the horizontal planar space required to locate an appliance for operation and dispensing in an establishment. The footprint includes the width and depth of counterspace allocated for restaurant equipment such as a brewer. Presently, the amount of counterspace available at establishments dwindles as additional products occupy more and more counterspace. For many years, coffee has been served at most establishments. In recent years though, coffee has expanded to include many varieties and flavors, cappuccino, espresso, teas, and iced tea. These newer products are prepared and dispensed from separate pieces of equipment, each with its own footprint that consumes counterspace. Coffee grinders and bulk coffee dispensers further crowd the available counterspace.

DESCRIPTION OF THE PRIOR ART

Saving horizontal space with vertical stacking commonly occurs in commercial settings. In areas of high real estate values, buildings soar to great heights thus, maximizing value per square foot of ground. On congested roads, particularly in England, busses have a second upper deck for transporting more people on a given square foot of road. In the brewed coffee field, Grindmaster® and Bunn® combined a brewer with an above mounted grinder. The grinder prepares coffee beans for brewing below it. The ground beans drop from the grinder into a brew basket to make coffee into a pot below. The brewer grinder combination saves counterspace but remains limited to dispensing a single product from a single pot.

The present invention though overcomes the limitations of the prior art where a need exists for effectively brewing more beverages per square foot. That is, the art of the present invention, a vertical multiple coffee brewer, places at least one brewer atop another brewer, the brewers with either separate or common heated water tanks, and separate controls for each brewer.

SUMMARY OF THE INVENTION

As counterspace dwindles in restaurants and other establishments, the expansion of new product offerings becomes limited. As the present invention stacks brewing machinery vertically, coffee production per square foot increases, and perhaps doubles or triples. Further, the stacking of brewing machinery utilizes the vacant vertical spaces in an establishment and opens counterspace for other products. The present invention also allows placement of different products, such as coffee varieties and flavors, for simultaneous brewing on a minimum footprint.

The vertical multiple coffee brewer begins with a base, generally planar and with or without feet, a housing upon the base extending upright while leaving room for at least one warmer on the base, a deck extending from the housing above the base with sufficient room beneath to admit a brew basket and a coffee pot, at least one warmer on the deck, a second deck extending from the housing again with room beneath it to admit a second brew basket and a coffee pot, and a top. In the preferred embodiment, the housing contains one tank for receipt and heating of water supplied to all of the brew baskets through piping and dump valves. In the alternate embodiment, the housing contains two vertically stacked tanks commonly supplied with fresh water but heating the water separately for delivery to each deck.

Additionally, the vertical multiple coffee brewer has top access to the housing and tanks, guards on the base and decks to guide front insertion of pots, controls for each warmer and brew basket, a hot water spigot, and centrally located dump valves. The applicants also foresee the following combinations of brewing machinery: glass bowl and carafe brewers, satellite dispenser brewers, glass bowl and single cup brewers, airpot and single cup brewers, and coffee and cappuccino.

The operating system for these combined appliances can be designed to incorporate conventional five quart tanks, singly or with multiple tanks. When a water siphon brewer design is utilized, water tanks can be stacked vertically. The stacking causes an inlet and outlet differential that creates a siphon action to dispense heated water into the brewing baskets. Alternatively, the tank or tanks dispense the heated water through piping with a dump valve to regulate delivery of heated water to the brewing basket. The piping connects to a tank below the fill line of the tank and slightly above the low water line of the tank. Alternatively, the dump valve may be located above the tank thus requiring a pump to lift heated water from the tank to the dump valve. A magnetic drive hot water pump lifts the heated water for distribution through the brewing machinery.

Therefore, the principal object of this invention is to provide increased production of brewed beverages per square foot of counter space in an establishment.

Another object of this invention is to provide for holding freshly brewed beverages in stacked containers one above the other for usage and application of dispensing of a variety of beverages.

Still another object of this invention to provide a multiple coffee brewer with a single tank and commonly located valves and controls for ease of use and of repair of the brewer.

Another object of this invention is to provide a multiple coffee brewer which maintains the plurality of pots warm with various beverages therein.

These and other objects may become more apparent to those skilled in the art upon review of the summary of the invention as provided herein, and upon undertaking a study of the description of the preferred embodiment in view of the drawings.

BRIEF DESCRIPTION OF THE DRAWINGS

In referring to the drawings,

FIG. 1 is an isometric view of the dual tank embodiment of the present invention with coffee pots placed thereupon;

FIG. 2 is an isometric view of the dual tank embodiment with warmers shown and a lid placed upon the top above the reservoir;

The same reference numerals refer to the same parts throughout the various figures.

DESCRIPTION OF THE PREFERRED EMBODIMENT

Figure 3:
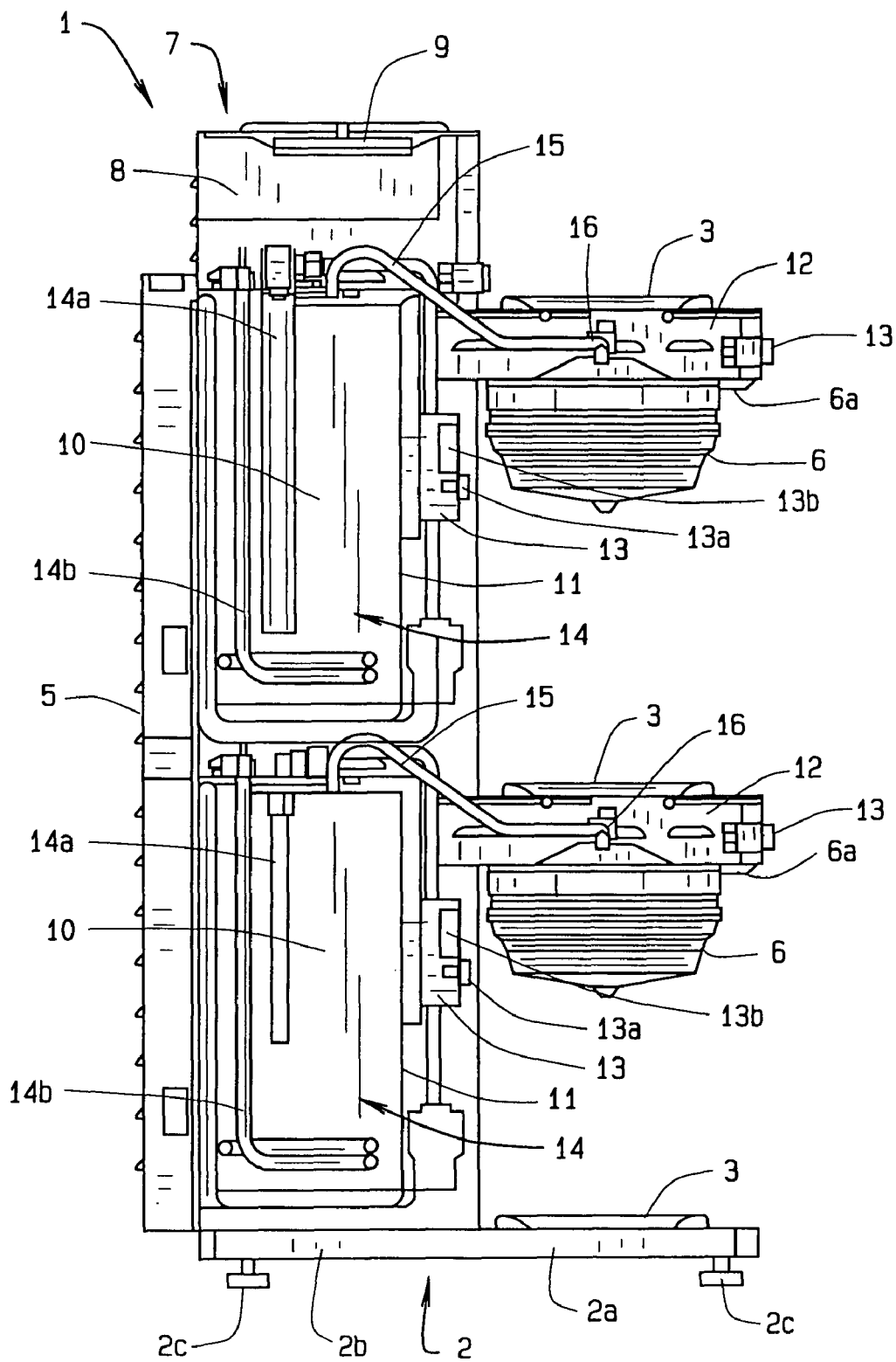
FIG. 3 is a section view of the dual tank embodiment including brew baskets installed.

The present art overcomes the prior art limitations by providing a brewer that stacks pots, baskets, and related plumbing vertically for producing more beverage, primarily coffee, in a given amount of square footage or counterspace. In referring to the drawings, and in particular FIG. 1, the multiple beverage brewer 1 is disclosed. The brewer has a generally rectangular base 2 with rounded corners. The base has a front half 2a with a warmer 3 that receives a pot 4. The rear half 2b of the base supports a housing 5. Beneath the base, a plurality of feet 2c raise the brewer slightly above the surface of a countertop.

The housing extends vertically above the base and has sufficient height for at least two pots and two brewing baskets 6. The housing has a top 7 opposite the base. The top has a reservoir 8 for admitting water into the brewer. The reservoir has a lid 9 for temporarily closing the reservoir to prevent contamination. The reservoir has upright sides 10 and a front 11 that extends laterally across the invention. The reservoir, like the housing, occupies the rear half 2b of the invention.

Extending from the housing, at least two decks 12 span over the front half of the base. The decks are mutually parallel and spaced apart to admit a pot and a brewing basket between a deck and the surface below. Each deck has a front edge 12a that faces the users of the invention. The front edge has at least one switch or control 13 for activating dispensing of water into a brew basket beneath the deck. Behind the edge, each deck has a warmer 3. The warmer is electrically operated and generally available in the prior art. As the lowest horizontal surface, the base also has a warmer for the lowest pot while the switch for the warmer is located in the deck above the base here shown in FIG. 1. Behind the edge, each deck has two parallel and spaced apart sides 12b that extend longitudinally. In the preferred embodiment, each side and the sides of the reservoir have a plurality of slots 8a for venting and cooling the spaces within the deck and the reservoir.

Then FIG. 2 shows a two brewer embodiment of the present invention that has three warmers. As before, the brewer has a base with a warmer, a housing extending upward from the rear half of the base, a reservoir on top of the housing, and two parallel and spaced apart decks. The reservoir has a lid 9 shown in this embodiment to have a hand hold 9a upon the diameter of the lid. Each deck in this embodiment has a warmer 3 located upon the top surface behind the edge 12a with the switch 13 and at least one track 6a upon the bottom surface opposite the warmer for guiding and positioning a brew basket. The brew basket is shown installed above the base and below the lower deck while the track 6a is shown below the upper deck without a brew basket, for clarity. The reservoir has a front 11 facing towards the warmer of the upper deck. Upon that front, the reservoir has at least two switches, with three shown here. These switches regulate the temperature of the three warmers shown in this embodiment.

Viewing the interior of the embodiment in FIG. 2, FIG. 3 describes and explains the water storage, plumbing, and brewing. The brewer has a base as before with a housing upon the base and decks extending perpendicular from the housing. The base and each deck have a warmer and the decks have a brew basket below the warmer. The reservoir receives water for combining with powders and other concentrates to make a beverage selected by the user. The reservoir provides water to each liquid storing vessel, or tank 14, here shown behind a deck. Water enters each tank through a fill tube 14a, extending into each tank that generally has a mouth above the bottom of the tank. Each tank is on end and stacked vertically within the housing. Within each tank, a heating coil 14b descends from the top of the tank to below the mouth of the fill tube. The heating coil has an upright portion parallel to the upright wall of a tank and a rounded coil portion proximate to the bottom of the tank. The heating coils generate heat through electric resistance with an applied current. Alternatively, the heating coils are hollow and admit steam to transfer heat to water within a tank.

From each tank, a hot water line 15 extends from the top through the housing and on to each deck. The hot water line is generally centered within the deck and has a brew head 16 generally in the center of a deck 12 aimed downwards towards a brew basket 6. The spray head disperses heated water over the brewing materials, such as beans, powders, or leaves. Opposite the spray head, each deck generally has a warmer as previously described. Then outside of each tank and within the housing, generally upon the front, a control 13 regulates the flow of heated water to each deck. The control has a sensor 13a that detects water temperature and opens a valve when the temperature reaches brewing level thus allowing heated water into the hot water line. The control also has a second sensor 13b that detects excessive water temperature and closes the valve to prevent scalding or worse damage to the present invention and users. Upon each deck, generally at the front, a switch 13 allows a user to activate the brewing of a beverage for the pot below the deck. The switch has an off position where no electricity flows to the heating coil and control, and an on position where electricity flows to the heating coil for heating water and to the control for regulating the flow of heated water into a brew basket.

Figure 4:
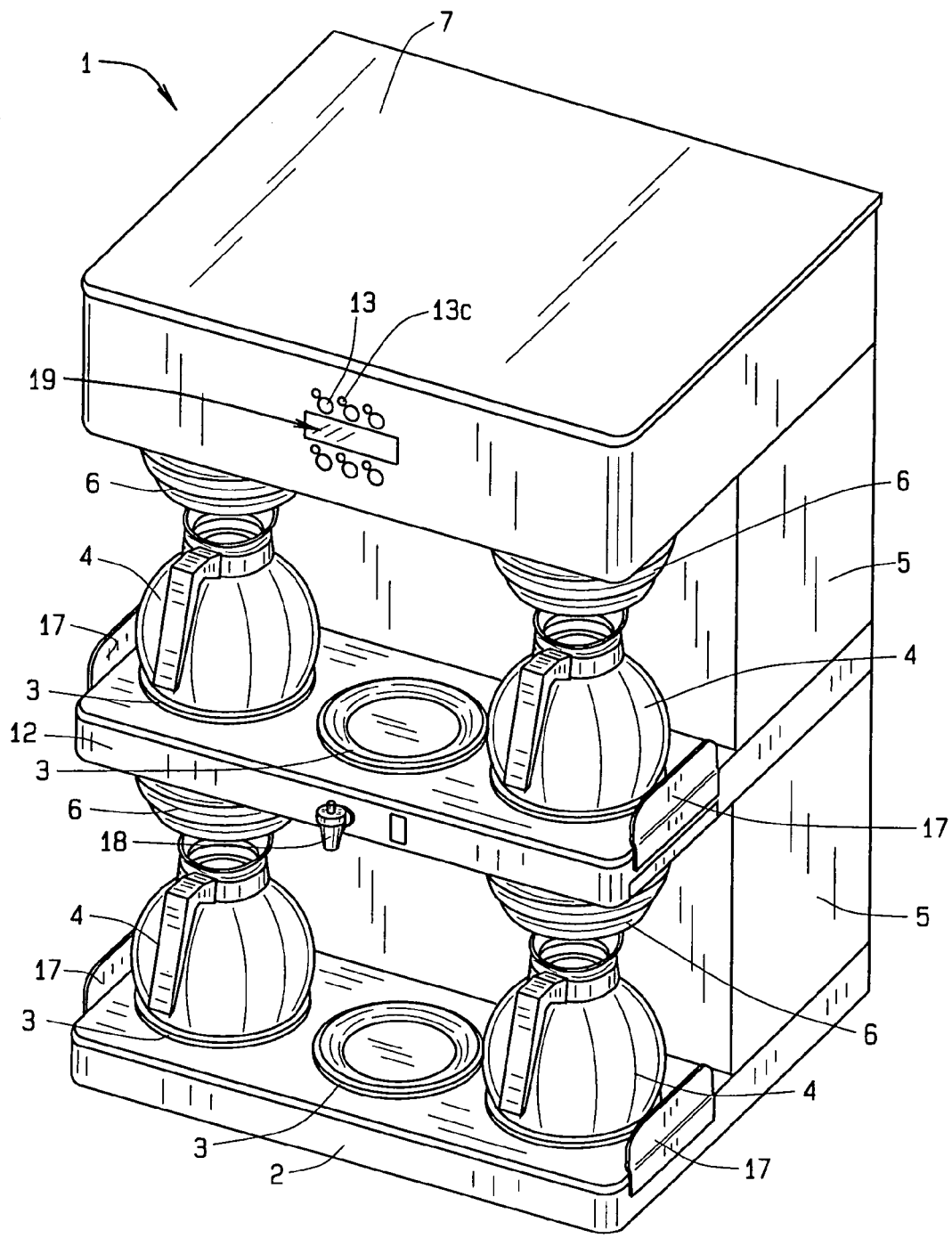
FIG. 4 is an isometric view of the single tank embodiment with a plurality of warmers; and, FIG. 5 is a partial exploded view of the single tank embodiment showing the gang of dump valves for the various brewers.

Moving to another alternate embodiment, FIG. 4 shows a four brewer with six warmer embodiment of the present invention. Expanding on FIG. 1, FIG. 4 has a brewer with a base, a housing extending upwards from the rear half of the base, a deck extending outwards from generally the middle of the housing, and a top having the same shape as the base. The base has a generally rectangular shape with a front half and a rear half. The front half has a top surface and two spaced apart lateral edges. Three warmers are spaced upon the top surface, with two warmers spaced apart and located beneath brew baskets, and a warmer centered between the other two warmers but not below a brew basket. The center warmer is for heating of a brewed pot of beverage. The other two warmers hold pots for receiving a brewed beverage. Upon each lateral edge, the base has a guard 17 extending upright generally in the same direction as the housing. Each guard is a thin planar member that deters users from removing a pot towards the side of the present invention. The guards also prevent spills.

Above the base, a deck extends from the housing and has generally the same shape as the base. Similar to FIG. 1, the deck has two brew baskets depending over the outer warmers of the base. The brew baskets are in fluid communication with a tank 14 within the housing later shown in FIG. 5. The deck has a line for heated water dispensed by a spigot 18 generally upon the front of the deck and located outwards from a center warmer. Like the base, the deck has a top surface and two lateral edges. The top surface has two outer warmers and a center warmer. The outer warmers receive pots for holding brewed beverages and the center warmer receives a pot for reheating of a beverage contained therein. The deck also has guards located upon each lateral edge both to prevent spills and to guide users in removing the pots towards the front of the brewer. The housing continues upwards from the deck.

A top extends from the housing spaced above the deck. The top has two brew baskets spaced apart for dispensing a brewed beverage into the pots on the outer warmers of the deck. The top is generally rectangular of the same shape as the deck and the base. The top has a front with a control panel 19 for regulating the brewing and warming of each brew basket and warmer. The control panel has a means 13, like a switch or button, for each warmer identified by position as those on the base and those upon the deck. Each means has an indicator, such as an LED 13c, to show when the means is activated. A user activated the means by finger pressure. The activated means in the control panel thus regulate the warming and brewing of the six locations in this embodiment.

Figure 5:
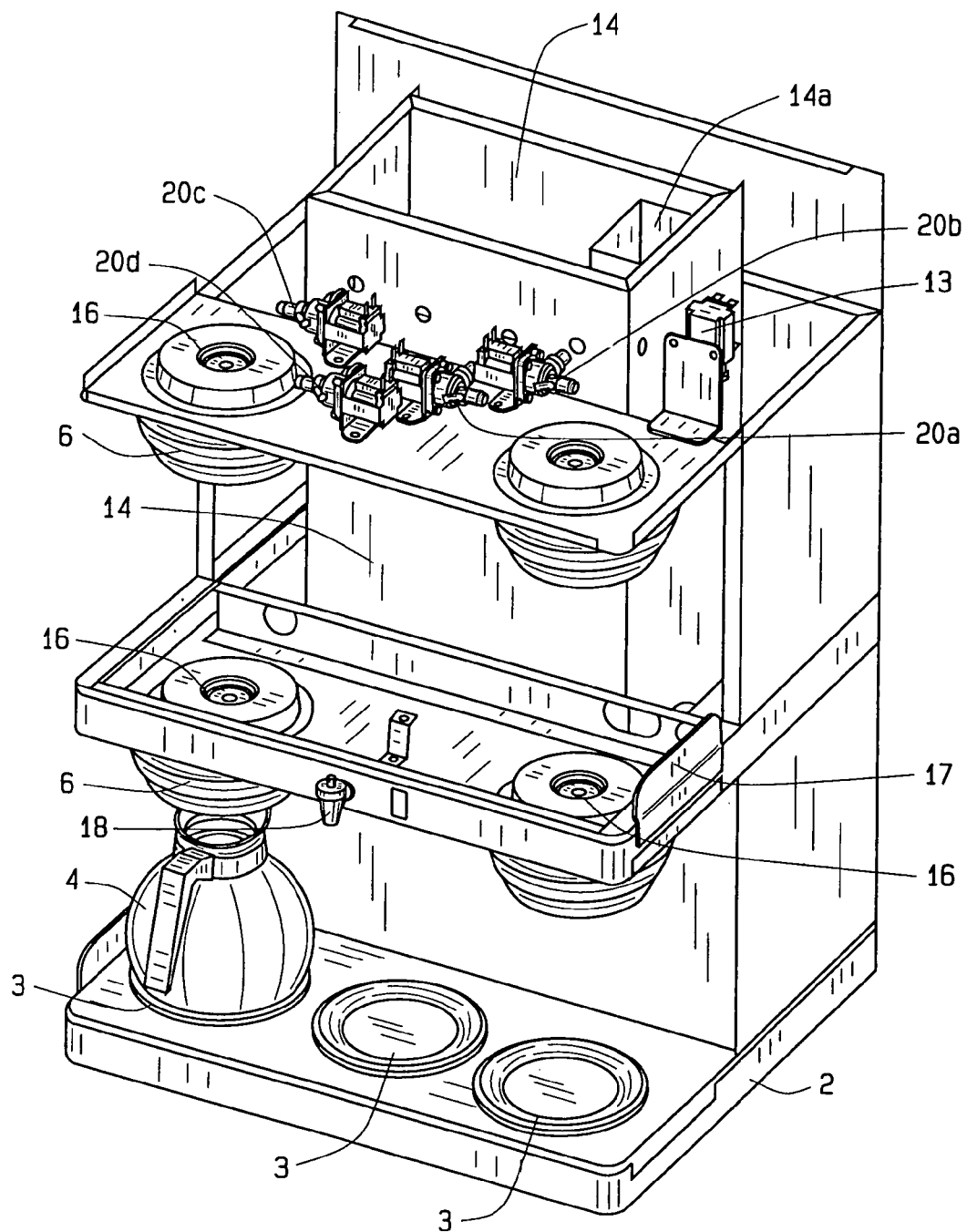

Removing a portion of the top and the deck top surface, FIG. 5 shows the interior of the alternate embodiment, particularly behind the control panel 19. The deck has two brewheads spaced apart over the outer warmers of the base. Between the brewheads, the deck has a spigot 18 centered upon the front for delivery of heated water, as in usage of a single cup for a beverage. Above the deck, the top has two brewheads also spaced apart above the outer warmers within the deck. Within the brewheads, the top has four dump valves 20 for regulating flow of heated water into the brew baskets. The dump valves 20c, 20d are spaced apart for connection to heated water lines and electrical supply. The dump valves 20a, 20b towards the left of FIG. 5 control heated water sent to the left brew baskets with those towards the right of FIG. 5 dispense heated water to the right brew baskets. The two dump valves 20b, 20c closest to the housing dispense heated water to the lower brew heads, those depending from the deck. The remaining dump valves 20a, 20d send heated water to the upper brew heads depending from the top. The dump valves have fluid communication to the single tank and related pump (not shown) in this embodiment.

The singe tank 14 occupies a substantial portion of the housing and extends from the housing up into the vicinity of the top. The tank is filled by removing the top of the housing and adding water or by a water line plumbed into the tank. A shaft 14a permits placement of a heating coil upon one side of the tank spaced apart from the fill tube or other mechanism to introduce water into the tank. The heating coil extends from the top to proximate the base. As before the heating coil has a straight upright section then a round coil towards the bottom. The round coil provides even heat through the lower portion of the tank. Heating the tank from the lower portion assists in mixing the water within the tank to a temperature for brewing and later drinking. The rising heated water mixes displaces cooler water until it reaches the upper portion of the tank. In the upper portion of the tank, the dump valves 20a, 20b, 20c, 20d have lines to guide heated water to each valve separately. The lines are in fluid communication to at least one pump for delivery of heated water. Each valve has an electrically powered solenoid activated by a control 13 connected to a water temperature sensor 13a and the control panel and its means for brewing at the four outer warmers. In usage, a user places a pot upon an outer warmer and brewing ingredients within a brew basket. The user presses the means corresponding to the desired warmer. That activates the heating coil to supply heated water to the appropriate dump valve. When the water reaches brewing temperature, the control directs the solenoid to open the dump valve. The appropriate dump valve then releases heated water into the brewhead for brewing a beverage. After a certain time interval, the dump valve closes to prevent overfilling a pot. The user can place up to four different beverage ingredients into the brew baskets for brewing from heated water coming from a common tank.

From the aforementioned description, a multiple beverage brewer has been described. This brewer is uniquely capable of brewing beverages upon at least two vertical levels. This brewer and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, are set forth for illustrative purposes only.

We claim:

1. A multiple beverage brewer for brewing beverages in at least to beakers and arranged vertically, comprising:
    a base, generally planar, and having a front portion and a rear portion;
    a housing extending upwardly from said rear portion;
    at least two vertically aligned liquid storing vessels provided within said housing;
    at least one warmer provided upon the base and its said front portion;
    at least two decks extending perpendicularly to said housing and over said front portion, said decks being mutually parallel, aligned vertically and spaced apart, having a similar shape as said base, and said decks being vertically aligned in the front portion of said apparatus;
    each of said decks having at least one brew basket depending beneath and over said front portion;
    a top above said decks;
    a plurality of piping in communication with said vessels and provided for delivering heated water to said vertically aligned brew baskets through said decks, and at least one heating element for each of said vessels, and a plurality of controls for regulating the dispensing of heated water for brewing a beverage within each brew basket and for delivery for dispensing;

said at least two vertically aligned liquid storing vessels having a longitudinal axis vertical oriented upright within said housing, and each of said vessels having said heating element locating therein;

one of said at least two decks locating above said base, and having a warmer locating opposite said brew basket, above said front portion, and generally spaced above said base;

the other of said at least two decks providing an upper deck, locating above said lower deck; and said top having a lid above said upper deck for providing access into said housing and two said liquid storing vessels.

2. The multiple beverage brewer of claim 1 wherein there are at least a pair of vertically aligned integrally formed bases, housing, liquid storing vessels, warmers, and at least a pair of decks integrally formed aligned side by side within the beverage brewer.

3. The vertical beverage brewing apparatus of claim 1 further comprising:

said upper deck having a warmer located opposite its said brew basket, above said front portion, and generally away from said base.

4. The vertical beverage brewing apparatus of claim 1 further comprising:

two of said liquid storing vessels, said vessels having a longitudinal axis oriented upright and parallel to the longitudinal axis of said housing;

each of said vessels having a top and an opposite bottom and a sidewall connecting said top and said bottom, a fill tube depending from said top into said vessel, said heating element locating therein, a line extending from said top through said housing and into said deck, said line terminating in a brew head locating above said brew basket, and controls for filling said vessel and for releasing heated water into said line; and, each of said decks having a warmer locating opposite said brew head.

5. The vertical beverage brewing apparatus of claim 1 further comprising:

said base having at least one guard located outwards of said warmer; and, said lower deck having at least one guard located outwards of said warmer.

6. The vertical beverage brewing apparatus of claim 5 further comprising:

said lower deck having a spigot for dispensing heated water from said vessel.

7. The vertical beverage brewing apparatus of claim 1 further comprising:

said vessel having a top and an opposite bottom and a sidewall connecting said top and said bottom, a connection to fresh water, said heating element locating within said vessel, at least two lines extending from said vessel into said top;

at least two valves locating within said top and in communication with said lines and in further communication with brew heads locating above each of said brew baskets;

a plurality of controls for filling said vessel and for activating said valves to release heated water into said lines; and, said base and said lower deck each having a warmer locating opposite each of said brew heads.

8. The vertical beverage brewing apparatus of claim 7 further comprising:

said lower deck having two spaced apart brew baskets;

said top having two spaced apart brew baskets; and, four valves locating within said top and in communication with said brew baskets.

* * * * *